United States Patent
Verbeure (10) Patent No.: US 9,837,030 B2
(45) Date of Patent: Dec. 5, 2017

(54) REFRESH RATE DEPENDENT ADAPTIVE DITHERING FOR A VARIABLE REFRESH RATE DISPLAY

(71) Applicant: NVIDIA Corporation, Santa Clara, CA (US)

(72) Inventor: Tom Verbeure, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 146 days.

(21) Appl. No.: 14/712,821

(22) Filed: May 14, 2015

(65) Prior Publication Data

US 2015/0339994 A1    Nov. 26, 2015

Related U.S. Application Data

(60) Provisional application No. 62/002,103, filed on May 22, 2014.

(51) Int. Cl.
*G09G 3/20* (2006.01)
*G09G 3/36* (2006.01)
(Continued)

(52) U.S. Cl.
CPC ............ *G09G 3/3618* (2013.01); *G06F 3/14* (2013.01); *G09G 3/2003* (2013.01); *G09G 3/2044* (2013.01); *G09G 3/3614* (2013.01); *G09G 5/363* (2013.01); *G09G 5/001* (2013.01); *G09G 5/399* (2013.01); *G09G 2320/043* (2013.01);
(Continued)

(58) Field of Classification Search
CPC ........ G09G 2340/0435; G09G 3/2044–3/2055
See application file for complete search history.

(56) References Cited

U.S. PATENT DOCUMENTS 7,542,620 B1 *   6/2009   Bilbrey ............... G09G 3/2044
                                                    382/264
2005/0210338 A1 *  9/2005  Young .................... G09G 5/363
                                                    714/57
(Continued)

FOREIGN PATENT DOCUMENTS

CN    101563717 A    10/2009
CN    101681614 A    3/2010
(Continued)

OTHER PUBLICATIONS

Chinese Office Action from Chinese Application No. 201510264261.9, dated May 22, 2017.

*Primary Examiner* — Sanghyuk Park
(74) *Attorney, Agent, or Firm* — Zilka-Kotab, PC (57) ABSTRACT

A method, computer program product, and system for selectively disabling temporal dithering is disclosed. The method includes the steps of configuring a display device to refresh utilizing a dynamic refresh rate to display images and selectively disabling temporal dithering of the images based on the dynamic refresh rate. Selectively disabling temporal dithering may comprise determining a dynamic refresh rate associated with a current frame of image data and disabling temporal dithering for the current frame of image data when the dynamic refresh rate is less than a first threshold value, or enabling temporal dithering for the current frame of image data when the dynamic refresh rate is greater than or equal to a second threshold value.

23 Claims, 6 Drawing Sheets

(51) Int. Cl.
*G06F 3/14* (2006.01)
*G09G 5/36* (2006.01)
G09G 5/00 (2006.01)
G09G 5/399 (2006.01)

(52) U.S. Cl.
CPC ............... *G09G 2330/021* (2013.01); *G09G 2340/0435* (2013.01); *G09G 2360/08* (2013.01); *G09G 2370/022* (2013.01)

(56) References Cited

U.S. PATENT DOCUMENTS

| | | | | |
|---|---|---|---|---|
| 2008/0198181 A1* | 8/2008 | Kondo | ................ | G09G 3/3648 345/690 |
| 2010/0254452 A1* | 10/2010 | Unger | ................ | G06F 3/1415 375/240.12 |
| 2013/0155319 A1* | 6/2013 | Enenkl | ................ | G09G 3/2044 348/441 |
| 2015/0109326 A1* | 4/2015 | Romano | ................ | G09G 5/18 345/618 |
| 2015/0109355 A1* | 4/2015 | Wang | ................ | G09G 3/2051 345/691 |

FOREIGN PATENT DOCUMENTS

| | | |
|---|---|---|
| CN | 201853471 U | 6/2011 |
| CN | 102362307 A | 2/2012 |
| CN | 103167259 A | 6/2013 |
| KR | 20010039182 A | 5/2001 |

\* cited by examiner

REFRESH RATE DEPENDENT ADAPTIVE DITHERING FOR A VARIABLE REFRESH RATE DISPLAY

CLAIM OF PRIORITY

This application claims the benefit of U.S. Provisional Application No. 62/002,103 titled "Refresh Rate Dependent Adaptive Dithering for a Variable Refresh Rate Display," filed May 22, 2014, the entire contents of which is incorporated herein by reference.

FIELD OF THE INVENTION

The present invention relates to display systems, and more particularly to a variable refresh rate display.

BACKGROUND

Conventional display devices (e.g., Cathode Ray Tube (CRT), Liquid Crystal Displays (LCD), Light Emitting Diode (LED), Organic LED (OLED), Active-Matrix OLED (AMOLED), etc.) operate at fixed refresh rates such as 60 Hz, 85 Hz, or 120 Hz. In other words, the display device is configured to refresh each of the pixels of the screen at a specific frequency. In conventional systems, the video signal transmitted to the display device must match the fixed frequency of the display device's refresh rate. Some display devices enable the fixed frequency refresh rate to be changed based on a configuration setting of the display device, but once that setting is changed each frame received by the display device is drawn to the screen at that fixed frequency. However, a graphics processing unit (GPU) may generate frames of pixel data at a variable rendering rate that is asynchronous with the fixed refresh rate of the display device.

For example, when a display device is operating at 60 Hz, the pixels of the display will be refreshed every 16.6 ms. However, each frame may take a variable amount of time to be rendered by the GPU so while one frame may take 12 ms to render, another frame with more complicated geometry may take 30 ms to render. Thus, completely rendered frames may not be ready in the frame buffer when the next frame needs to be output to the display device via a video interface. In such situations, the GPU may be configured to repeatedly output the previous frame on the video interface until the next frame is ready. This situation can cause image artifacts that a viewer may perceive as choppy video. For example, image tearing may occur if the image being output to the display device is switched part way through the frame (V-SYNC Off). Conversely, image stuttering may occur if the image being output to the display device is only switched between frames, thereby causing some frames to be repeated and/or causing some frames to be skipped (V-SYNC On).

Newer display devices may be configured to operate synchronously with the GPU utilizing a dynamic refresh rate. For example, some monitors may be compatible with NVIDIA's G-SYNC™ technology that enables the display device to synchronize the refresh of pixel elements for displaying a frame with the variable rendering rate of the GPU. The GPU is configured to transmit frames of pixel data to the display device via the video interface as the frames are rendered, and the display device is configured to refresh the pixels of the display device in response to receiving the frames of pixel data rather than at a fixed frequency refresh rate. In other words, the refresh rate of the display device is not fixed at a particular frequency, but instead adjusts dynamically to the rate image data is received from the GPU.

As long as the GPU renders frames of image data at a reasonably fast rendering rate, the types of image artifacts associated with conventional systems may be reduced. However, in some cases, the GPU may have trouble rendering particular frames in a reasonable amount of time due to the complexity of a scene. For example, a particular frame of pixel data may take, e.g., 100 ms to be rendered, which corresponds to a dynamic refresh rate of 10 Hz for that particular frame. The effective refresh rate of the monitor when there are large delays between successive frames may cause other types of image artifacts to begin to appear. For example, applying temporal dithering at low refresh rates may cause a portion of an image to appear to shimmer.

Each pixel element in an LCD monitor may be capable of displaying colors associated with values having 8-bits of depth (i.e., the pixel can display 256 different levels of each color component of the pixel). However, the pixel may effectively display additional colors associated with values having higher bit depths by varying the colors displayed between consecutive frames. In order to effectively display an effective color between two real colors capable of being reproduced by the pixel, a color value at a first bit depth that is lower than an intermediate color value at a second bit depth is displayed during a first frame period, where the second bit depth is greater than the first bit depth. Then, a color value at the first bit depth that is higher than the intermediate color value at the second bit depth is displayed during a second frame period. If the refresh rate of the display device is fast enough, then the viewer perceives an effective color having a level that approximates the intermediate color value rather than the actual displayed colors associated with the lower color value and the higher color value. However, when the refresh rate falls too low, then the viewer may begin to perceive two distinct colors being produced by the pixel rather than perceiving the effective color corresponding to the intermediate color value (i.e., the viewer perceives the color associated with the lower value and then the color associated with the higher value instead of a single mid-range color). This may result in a shimmering effect being perceived by a viewer. Thus, there is a need for addressing these issues and/or other issues associated with the prior art.

SUMMARY

A method, computer program product, and system for selectively disabling temporal dithering is disclosed. The method includes the steps of configuring a display device to refresh utilizing a dynamic refresh rate to display images and selectively disabling temporal dithering of the images based on the dynamic refresh rate. Selectively disabling temporal dithering may comprise determining a dynamic refresh rate associated with a current frame of image data and disabling temporal dithering for the current frame of image data when the dynamic refresh rate is less than a first threshold value, or enabling temporal dithering for the current frame of image data when the dynamic refresh rate is greater than or equal to a second threshold value.

DETAILED DESCRIPTION

Dithering may be used to display images with a bit depth that is greater than the bit depth the display device is capable of reproducing. Temporal dithering and spatial dithering techniques are well-known. In temporal dithering, a value of a particular pixel may be varied over a plurality of frames displayed in short succession such that the effective value of the pixel appears to be between a low value and a high value. In spatial dithering, noise may be added to groups of pixels within the image to reduce visible quantization when a bit depth of an image is reduced to be displayed by the display device. The noise may be specified as a dither pattern that is applied to the groups of pixels based on the least significant bits discarded during quantization. While the effectiveness of spatial dithering is not dependent on the refresh rate of the display device because spatial dithering is static over time for identical frames, the effectiveness of temporal dithering is dependent on the refresh rate of the display device because temporal dithering is implemented over multiple frames.

When the display device operates at a refresh rate above a threshold value (e.g., 60 Hz), image artifacts associated with temporal dithering may not be noticeable. However, as the refresh rate of the display device drops below this threshold value, the temporal dithering may become noticeable. At low refresh rates (e.g., 30 Hz), the temporal dithering may cause noticeable image artifacts as values of the pixels are changed from one frame to the next. It is desirable to reduce these image artifacts caused by temporal dithering implemented with low dynamic refresh rates.

Figure 1:
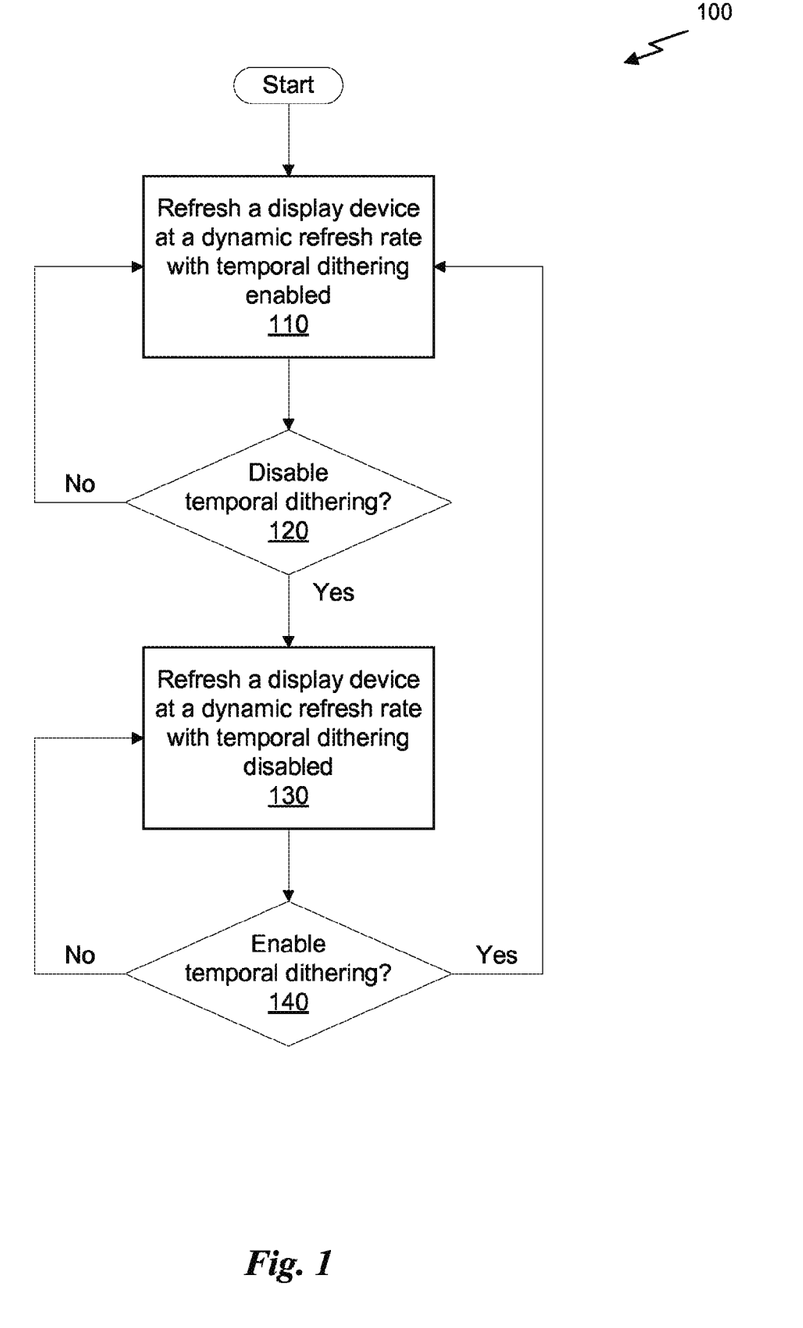
FIG. 1 illustrates a flowchart of a method for enabling and disabling temporal dithering, in accordance with one embodiment.

FIG. 1 illustrates a flowchart of a method 100 for enabling and disabling temporal dithering, in accordance with one embodiment. At step 110, a display device is refreshed at a dynamic refresh rate with temporal dithering enabled. At step 120, the dynamic refresh rate of the display device is monitored to determine whether temporal dithering should be disabled. In one embodiment, a timing controller in the display device monitors the dynamic refresh rate of the display device and enables/disables temporal dithering. In another embodiment, a scaling unit in the display device monitors the dynamic refresh rate of the display device and enables/disables temporal dithering. In yet another embodiment, a processor external to the display device, such as a graphics processing unit, monitors the dynamic refresh rate of the display device and enables/disables temporal dithering. If the dynamic refresh rate, as stated in Hertz, is greater than or equal to a threshold value, then the method 100 returns to step 110 and the temporal dithering remains enabled as the display device is refreshed thereby presenting the next frame of pixel data on a screen of the display device. However, if the dynamic refresh rate is less than the threshold value, then the method 100 proceeds to step 130.

At step 130, a display device is refreshed at a dynamic refresh rate with temporal dithering disabled. At step 140, the dynamic refresh rate of the display device is monitored to determine whether temporal dithering should be enabled. If the dynamic refresh rate is greater than or equal to a threshold value, then the method 100 returns to step 110 and the temporal dithering is enabled as the display device is refreshed thereby presenting the next frame of pixel data on a screen of the display device. However, if the dynamic refresh rate is less than the threshold value, then the method 100 returns to step 130 and temporal dithering remains disabled.

In one embodiment, the threshold value in step 120 and the threshold value in step 140 are equal such that temporal dithering is enabled whenever the dynamic refresh rate is greater than or equal to the threshold value and disabled whenever the dynamic refresh rate is less than the threshold value. In another embodiment, enabling/disabling of the temporal dithering may be implemented utilizing a hysteresis where the threshold value in step 120 is less than the threshold value in step 140. For example, temporal dithering may be disabled when the dynamic refresh rate falls below 30 Hz, but temporal dithering may only be enabled when the dynamic refresh rate rises above 40 Hz. The hysteresis, or difference between the two distinct threshold values, reduces the chance of rapidly switching between enabling and disabling the temporal dithering when the dynamic refresh rate of the display device varies slightly between frames at a dynamic refresh rate that is proximate to the single threshold value.

It will be appreciated that the dynamic refresh rate associated with a frame is inversely proportional to a delay between that frame and a previous frame. In other words, larger dynamic refresh rates correspond to smaller delays between the frame and a previous frame. Similarly, smaller dynamic refresh rates correspond to larger delays between the frame and a previous frame. For example, a refresh rate of 30 Hz corresponds to a delay of 33.3 ms whereas a refresh rate of 60 Hz corresponds to a delay of 16.6 ms. Thus, enabling temporal dithering when the dynamic refresh rate is greater than or equal to a threshold value is equivalent to enabling temporal dithering when a delay is less than or equal to the threshold value. Similarly, disabling temporal dithering when the dynamic refresh rate is less than a threshold value is equivalent to disabling temporal dithering when a delay is greater than the threshold value.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
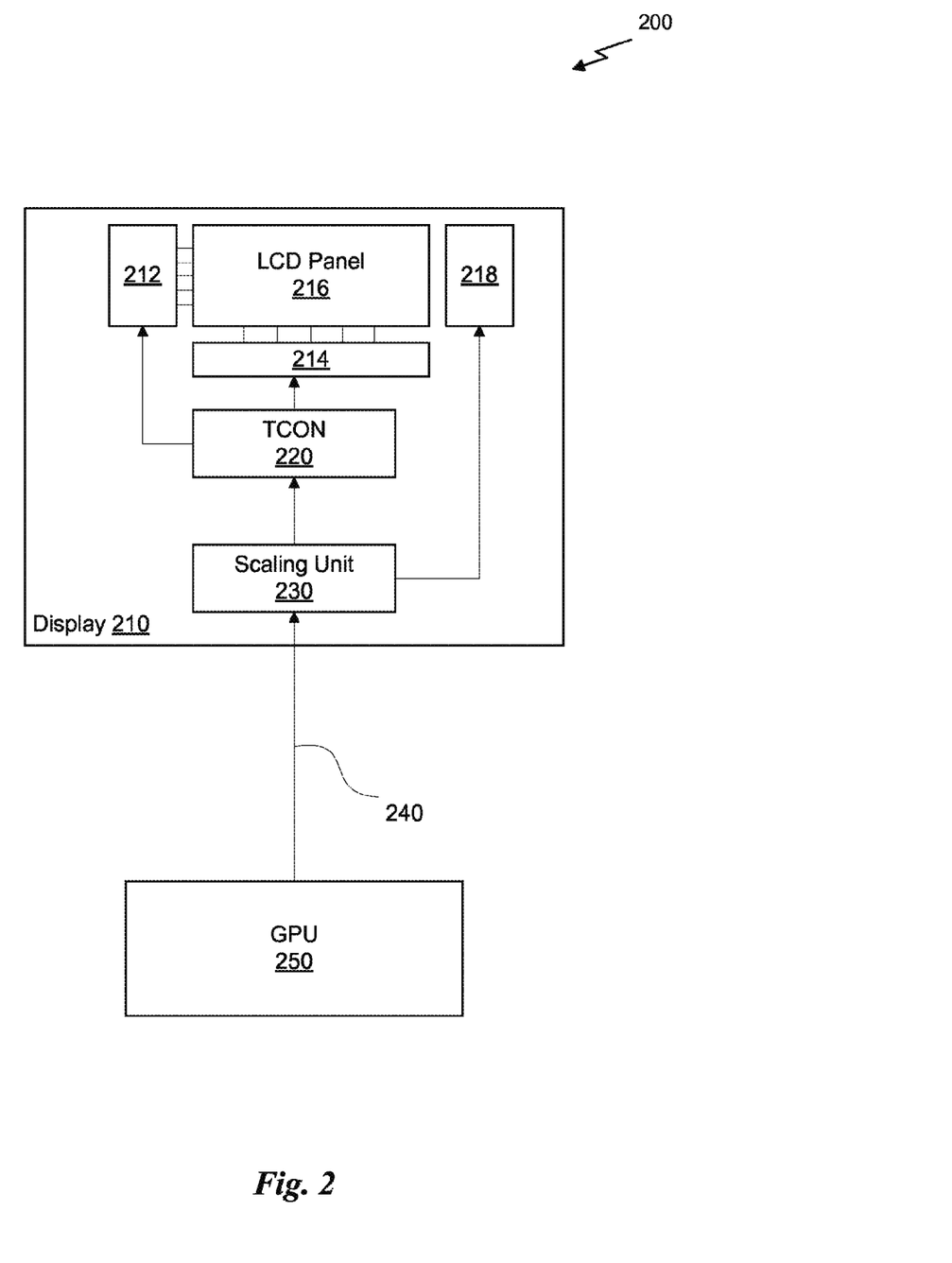
FIG. 2 illustrates a system that includes a dynamic refresh rate capable display, in accordance with one embodiment.

FIG. 2 illustrates a system 200 that includes a dynamic refresh rate capable display 210, in accordance with one embodiment. In one embodiment, the display 210 includes an LCD panel 216 that includes a plurality of pixel elements, each pixel element comprising a plurality of liquid crystal elements corresponding to a plurality of color components (e.g., a red component, a green component, and a blue component). The display 210 may also include row drivers 212 and column drivers 214 for controlling each of the pixel elements in the LCD panel 216. The row drivers 212 and column driver 214 enable each individual pixel element in the LCD panel 216 to be addressed and each liquid crystal element of the pixel element to have a voltage applied thereto in order to vary a level of the corresponding color component displayed by the pixel element.

The display 210 also includes a backlight 218, which may comprise one or more compact fluorescent lights (CFLs) arranged around the edge or edges of the LCD panel 216, one or more LEDs arranged around the edge or edges of the LCD panel 216, or an array of LEDs arranged behind the pixel elements of the LCD panel 216. It will be appreciated that, in some embodiments, the display 210 may be an OLED panel or AMOLED panel that does not include the backlight 218.

The display 210 may also include a timing controller (TCON) 220 and a scaling unit 230. The TCON 220 controls the row drivers 212 and the column drivers 214 in order to display the frames of pixel data on the LCD panel 216. The scaling unit 230 receives a video signal from a GPU 250 via a video interface 240. The video signal may correspond to a particular video signal format, such as a digital video signal format or an analog video signal format. Exemplary digital video signal formats include DVI (Digital Visual Interface), HDMI (High-Definition Multimedia Interface), and the like. Exemplary analog video signal formats include NTSC (National Television System Committee), PAL (Phase Alternating Line), VGA (Video Graphics Array), and the like.

The particular video signal received via the video interface 240 may have a resolution that does not match a native resolution of the LCD panel 216. Thus, the scaling unit 230 is configured to scale the image frames encoded within the video signal to match the native resolution of the LCD panel 216. The scaling unit 230 may be configured to scale the image frames in the horizontal directions and/or the vertical direction. In one embodiment, the scaling unit 230 may filter the image frames.

The scaling unit 230 may also control the backlight 218. For example, the scaling unit 230 may determine a particular level of illumination the backlight 218 should provide for a given frame of image data and control the backlight 218 to provide the particular level of illumination. In an alternate embodiment, the display 210 may include a separate circuit that controls the backlight 218 such that the scaling unit 230 does not control the backlight 218.

The GPU 250 may render frames of pixel data based on 3D primitives defined by an application executing on a CPU (not explicitly shown). The frames of pixel data may be stored in a frame buffer, which is a portion of memory allocated to store pixel data that is utilized to generate the video signal transmitted over the video interface 240. In one embodiment, the GPU 250 may be associated with a dual frame buffer (or ping-pong buffer) that includes a first portion of the frame buffer that stores pixel data for a previously rendered frame that is read out of memory and encoded within the video signal transmitted via the video interface 240 and a second portion of the frame buffer that stores pixel data for the current frame being rendered by the GPU 250. Once the GPU 250 has completed rendering of the current frame, the roles of the first portion of the frame buffer and the second portion of the frame buffer may be switched such that the second portion of the frame buffer stores pixel data for the recently rendered frame that is read out of memory and encoded within the video signal transmitted via the video interface 240 and the first portion of the frame buffer stores pixel data for the next frame being rendered by the GPU 250. The roles of the first and second portion of the frame buffer may alternate after each frame is rendered.

As used herein, a bit depth of the display 210, a bit depth of the LCD panel 216, and/or a bit depth of the pixel elements in the LCD panel 216 refers to a number of bits utilized to distinguish between the various levels of illumination capable of being produced by each liquid crystal element for a corresponding color component of a pixel element. For example, a display having a bit depth of eight bits corresponds to a display that includes pixel elements where each liquid crystal element for a corresponding color component is capable of producing 256 distinct levels of illumination.

Figure 3:
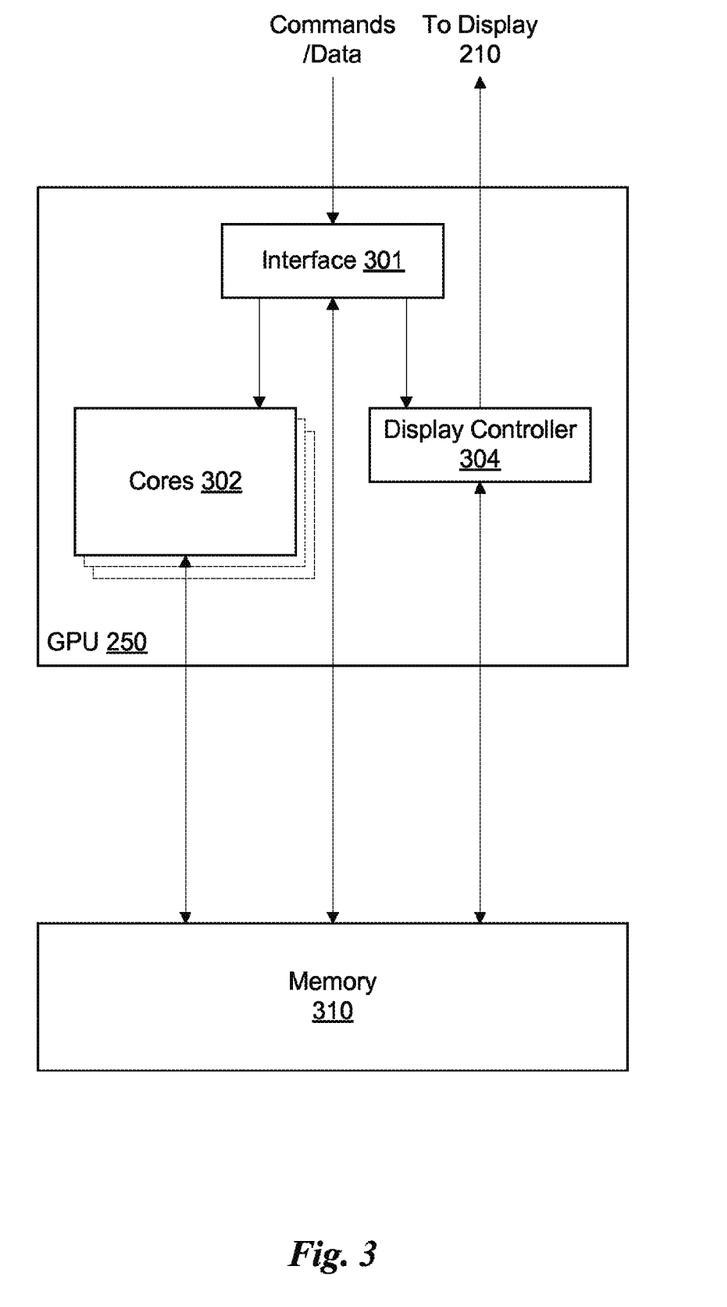
FIG. 3 illustrates the operation of the GPU of FIG. 2, in accordance with one embodiment.

FIG. 3 illustrates the operation of the GPU 250 of FIG. 2, in accordance with one embodiment. As shown in FIG. 3, the GPU 250 may be connected to a memory 310. The memory 310 may be a synchronous dynamic random access memory (SDRAM) configured to store data accessible to the GPU 250. In one embodiment, the memory 310 is a dedicated video memory that is only accessible by the GPU 250. In another embodiment, the memory 310 is a system memory that is shared between a CPU and the GPU 250.

The GPU 250 may receive commands and data from a CPU via the interface 301. The interface 301 may be, e.g., a PCIe (Peripheral Component Interconnect Express) interface that enables the GPU 250 to communicate with the CPU and/or a system memory via a bus (not explicitly shown). The GPU 250 may also include one or more cores 302 that process the data based on the commands. Each core 302 may be multi-threaded to process multiple data in parallel. In one embodiment, the cores 302 have a SIMD (Single-Instruction, Multiple Data) architecture. In SIMD architectures, a plurality of processing units process different data based on the same instruction. In another embodiment, the cores 302 have a MIMD (Multiple-Instruction, Multiple Data) architecture. In MIMD architectures, a plurality of processing units process different data based on different instructions scheduled on each processing unit. In yet another embodiment, the cores 302 have a SIMT (Single-Instruction, Multiple-Thread architecture. In SIMT architectures, a plurality of processing units process a plurality of related threads, each thread having the same instructions configured to process different data, but each thread capable of branching independently. In other words, individual threads may be masked to prevent execution of certain instructions in SIMT architectures. This enables conditional execution of the instructions associated with the plurality of threads. The GPU 250 may also include a display controller 304 that is configured to generate the video signals over the interface 240 according to the specification of a particular video signal interface. The display controller 304 may read the image data from the frame buffer in the memory 310 and convert the values stored in the frame buffer into signals transmitted via the interface 240.

In one embodiment, the GPU 250 may be configured to implement the method 100 of FIG. 1. More specifically, the GPU 250 may render frames of image data based on commands and data received from a CPU over the interface 301. The GPU 250 may store the rendered frames of image data in a frame buffer in the memory 310. After each frame of image data is rendered, the GPU 250 may generate a video signal transmitted over the interface 240 to cause the frame of image data to be presented on the display 210.

Prior to generating the video signal for the current frame of image data, the GPU 250 may be configured to determine a dynamic refresh rate associated with the current frame of image data. In one embodiment, the GPU 250 stores a timestamp associated with each frame of image data rendered to the frame buffer. For example, a last command associated with the rendering of each frame may access a system clock and store a time represented by the system clock in a register, a local shared memory (e.g., Static RAM or SRAM included on the silicon substrate of the GPU 250), or an external memory such as the memory 310. The timestamps may be utilized to calculate a time between rendering any two frames of image data.

In one embodiment, the GPU 250 may determine the dynamic refresh rate associated with the current frame of image data by calculating a delay time associated with the current frame of image data. In one embodiment, the delay time is calculated by subtracting a timestamp associated with a previous frame of image data from a timestamp associated with the current frame of image data. In this case, the current frame of image data is presented on the display 210 immediately subsequent to the previous frame of image data such that the delay time represents a time between transmitting two adjacent frames of image data in the stream of video data.

In another embodiment, the GPU 250 may determine the dynamic refresh rate associated with the current frame of image data by calculating an average delay time associated with N frames of image data. In other words, the dynamic refresh rate represents a moving average based on the delay times associated with the last N frames of image data. The dynamic refresh rate, in this embodiment, may be calculated by finding a difference between a timestamp associated with an $N^{th}$ frame of image data in the plurality of frames of image data from a timestamp associated with the current frame of image data in the plurality of frames of image data and dividing the difference by the value of N. It will be appreciated that the N frames are N adjacent frames and that the current frame of image data is presented on the display 210 N-1 frames after the $N^{th}$ frame of image data. By averaging the dynamic refresh rate over N frames rather than just a single frame, the GPU 250 prevents temporal dithering from being disabled based on an irregularly long delay time associated with a particular frame of image data.

The calculated delay time may be used to determine the dynamic refresh rate. In one embodiment, the dynamic refresh rate may have a unit format in Hertz, which is calculated by taking the inverse of the calculated delay time $$\left( \text{e.g.,} \frac{1}{16.6 \text{ ms}} = 60 \text{ Hz} \right).$$

In another embodiment the dynamic refresh rate may have a unit format in seconds (or milliseconds, microseconds, etc.), which corresponds to the calculated delay time. In other words, the dynamic refresh rate simply refers to the calculated delay time and threshold values are compared to the calculated delay time in order to selectively disable temporal dithering.

Once the GPU 250 has determined the dynamic refresh rate, the GPU 250 may be configured to selectively disable temporal dithering based on the dynamic refresh rate. In one embodiment, the GPU 250 may disable temporal dithering for the current frame of image data when the dynamic refresh rate, having a unit format in Hertz, is less than a first threshold value, and the GPU 250 may enable temporal dithering for the current frame of image data when the dynamic refresh rate is greater than or equal to a second threshold value. Again, the first threshold value and the second threshold value may be equal, or may be offset in order to implement a hysteresis in the disabling/enabling of the temporal dithering. In addition, the threshold values may be preset, such as hard-coded in a firmware or driver for the GPU 250, or specified by a user utilizing a graphical user interface associated with the driver of the GPU 250. Furthermore, in some embodiments, the user may control whether the GPU 250 selectively disables temporal dithering utilizing the graphical user interface associated with the driver of the GPU 250 by configuring temporal dithering to be always enabled or always disabled regardless of the value of the dynamic refresh rate.

In another embodiment, the GPU 250 may disable temporal dithering for the current frame of image data when the dynamic refresh rate, having a unit format in seconds and being equivalent to the calculated delay time, is greater than a first threshold value, and the GPU 250 may enable temporal dithering for the current frame of image data when the dynamic refresh rate is less than or equal to a second threshold value. In other words, in both embodiments, temporal dithering will be disabled when the delay between successive frames becomes too large.

When temporal dithering is disabled, the GPU 250 generates a video signal that transmits the current frame of image data to the display 210. It will be appreciated that the bit depth of values included in the image stored in the frame buffer may not match the bit depth of the display 210. For example, a bit depth of the values in the image may be ten bits per component value in each pixel and a bit depth of the display 210 may be eight bits per liquid crystal element corresponding to each color component. When the bit depth of the display 210 is less than a bit depth of the image in the frame buffer, each value in the image may be truncated to match the bit depth of the display 210 before being encoded in the video signal. A first portion of the value including the N most significant bits of the value is selected as the base value, where the number N matches the bit depth of the display 210. The bits not included in the first portion of the value may be referred to herein as the truncated bits. For example, for each ten bit value in an image, the most significant eight bits of the value may be selected as a base value and the two least significant bits may be referred to as the truncated bits.

When temporal dithering is disabled, the truncated bits may simply be discarded and the values in the image may be encoded in the video signal by encoding the base value for each corresponding value in the image. Thus, for each frame of image data transmitted to the display, a portion of the image data (i.e., the truncated bits for each value) will be discarded so that the video signal matches a bit depth of the display 210.

In contrast, when temporal dithering is enabled, the truncated bits may be utilized to select a dither pattern to apply to the image data. Applying the dither pattern to the image values when encoding the image values in the video signal enables an image having an effective bit depth larger than the bit depth of the display to be perceived by a viewer. A plurality of dither patterns may be defined in a memory or stored in one or more registers of the GPU 250. The dither patterns may represent an arrangement for varying pixel values for a particular frame of image data based on the relative position of the frame within the video stream. The number of dither patterns may correspond to $2^M$ where M refers to the number of additional bits of bit depth effectively displayed utilizing temporal dithering. In one embodiment, two additional bits of bit depth may be effectively displayed using four separate dither patterns.

For example, a first dither pattern may be 0b0000; a second dither pattern may be 0b0001, 0b0010, 0b0100, or 0b1000; a third dither pattern may be 0b0011, 0b0101, 0b0110, 0b1010, or 0b1100; and a fourth dither pattern may be 0b0111, 0b1011, 0b1101, or 0b1110. The dither pattern may represent a pulse width modulated signal having a duty cycle that corresponds to an effective intermediate value between a base value and an incremental value. The first dither pattern may correspond to a value of the truncated bits equal to 0b0000, the second dither pattern may correspond to a value of the truncated bits equal to 0b01, the third dither pattern may correspond to a value of the truncated bits equal to 0b10, and the fourth dither pattern may correspond to a value of the truncated bits equal to 0b11.

When temporal dithering is enabled, the GPU 250 (i.e., the display controller 304) may select a value for the image stored in the frame buffer, determine the base value and a value of the truncated bits, and then select a dither pattern to apply to the base value based on the truncated bits. Once a particular dither pattern is selected, then the GPU 250, via the display controller 304, encodes a particular value in the video signal as either the base value or the incremental value that is one more than the base value. In order to determine whether to encode the image value as the base value or the incremental value, the GPU 250 determines a value of the $i^{th}$ bit in the dither pattern. If the $i^{th}$ bit in the dither pattern is a '0' then the image value is encoded as the base value in the video signal. However, if the $i^{th}$ bit in the dither pattern is a '1' then the image value is encoded as the incremental value in the video signal. In one embodiment, the GPU 250 may maintain a counter than represents a relative position of a frame to other preceding frames in the video stream. In other words, the counter holds a value that represents the number of the current frame in the video stream. The P least significant bits of the counter are used as the index into the dither pattern, where $2^P$ is equal to a number of bits in the dither pattern. For example, if the dither pattern includes four bits, then the two least significant bits of the counter may be used to select any of the four bits in the dither pattern.

In one embodiment, a number of most significant bits in the truncated bits may be utilized to select the dither pattern, where the number of most significant bits is less than the number of truncated bits. For example, the most significant bit in the truncated bits may be used to select between two different dither patterns. In another example, the two most significant bits in the truncated bits may be used to select between four different dither patterns, even when the number of truncated bits is greater than two bits. Although temporal dithering may be implemented as set forth above, other well-known techniques for implementing temporal dithering may be implemented in lieu of the technique described above and are contemplated as being within the scope of the present disclosure.

Applying the dither pattern to the image data, as set forth above, may result in image artifacts when the dynamic refresh rate drops below a certain level. Thus, the dynamic refresh rate may be used to selectively disable the temporal dithering. In one embodiment, the GPU 250 may determine whether temporal dithering is enabled or disabled based on the value of the dynamic refresh rate for the current frame. If the value of the dynamic refresh rate is less than a threshold value, then the GPU 250 may disable temporal dithering such that the display controller 304 encodes the frame of image data without applying the dither pattern to the values in the frame buffer (i.e., temporal dithering is disabled). Once temporal dithering is disabled, then the GPU 250 may enable temporal dithering when the dynamic refresh rate is greater than or equal to a second threshold value. Again, the first and second threshold values may be either equal or offset by an offset value in order to implement a hysteresis associated with the selective disabling of the temporal dithering.

It will be appreciated that temporal dithering may be selectively disabled by the GPU 250 while spatial dithering remains enabled. In other words, since spatial dithering is only applied to a single frame and is not affected by the dynamic refresh rate of the display, spatial dithering may always be enabled, or may be selectively disabled based on input from a user (e.g., input received through a graphical user interface associated with a driver corresponding to the GPU 250).

Furthermore, it will be appreciated that the GPU 250 may control selective disabling of temporal dithering and that the display 210 is configured to merely present the image data received via the video signals on the LCD panel 216. In other words, the GPU 250 implements the logic for performing the method 100 merely utilizing the display 210 to present the frames of dithered image data to a viewer. In other embodiments, the logic for selectively disabling temporal dithering may be moved from the GPU 250 to the display 210.

Figure 4:
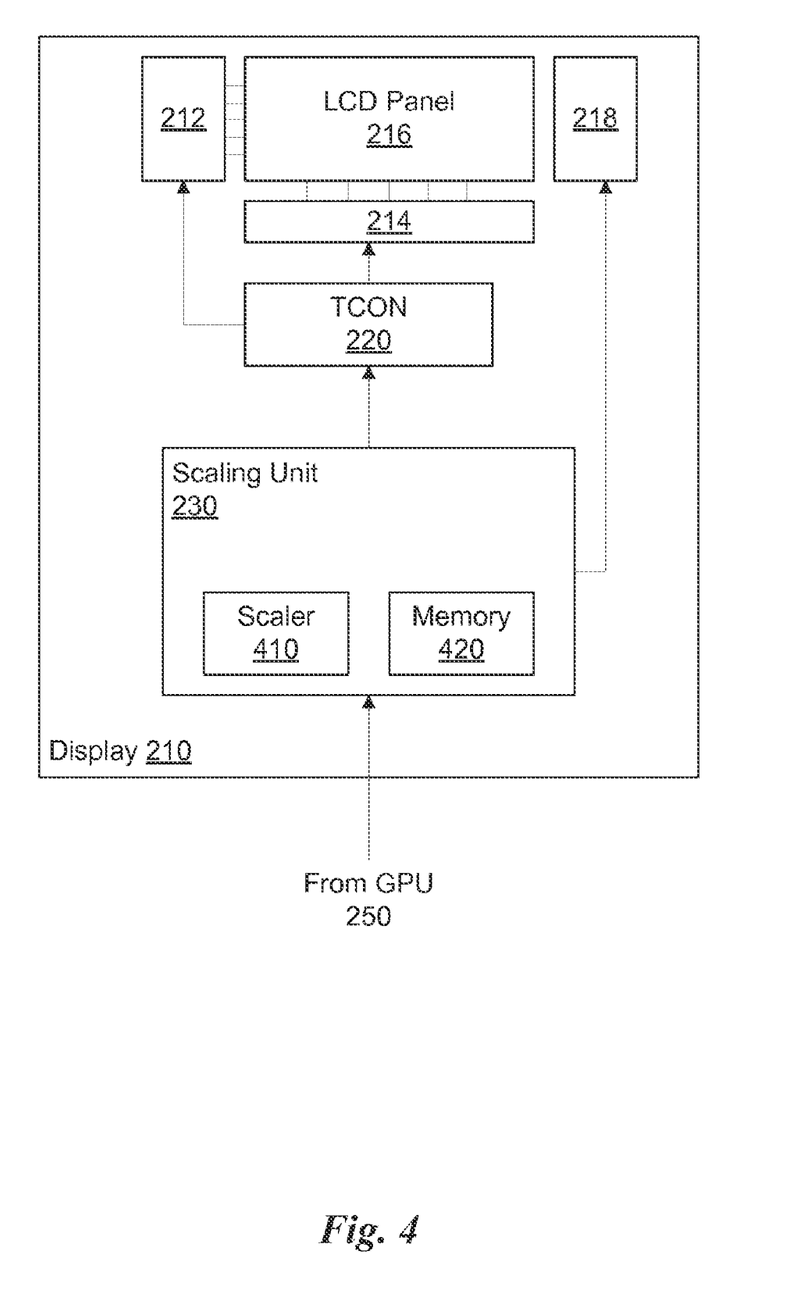
FIG. 4 illustrates the operation of the scaling unit of FIG. 2, in accordance with another embodiment.

FIG. 4 illustrates the operation of the scaling unit 230 of FIG. 2, in accordance with another embodiment. Again, the scaling unit 230 is configured to scale the frames of image data encoded in the video signals received via the interface 240 to match a native resolution of the display 210. As shown in FIG. 4, the scaling unit 230 may include a scaler 410 and a local memory 420. The scaling unit 230 may be a fixed function hardware unit embodied on an ASIC (application specific integrated circuit) included in the display 210. In another embodiment, the scaling unit 230 may be included on a larger ASIC that includes the TCON 220.

The scaler 410 may receive the frame of image data at a resolution generated by the GPU 250. The scaler 410 may determine the resolution of the frame of image data by analyzing the video signal (i.e., counting the number of pixels between horizontal synchronization signals and/or vertical synchronization signals), or the scaler 410 may receive a configuration signal from the GPU 250 over the interface 240 that specifies a resolution of the frames of image data transmitted over the interface 240. The scaler 410 may then scale the frame of image data from the original resolution provided by the GPU 250 to the native resolution of the display 210. When the original resolution matches the native resolution, then no scaling of the image data may be required. The scaled image data may be generated via, e.g., interpolating one or more values in the original image data to generate values for each pixel location in the scaled image data at the native resolution. The frame of image data may be stored in the local memory 420 and filtered (e.g., interpolated, etc.) to generate scaled image data for the TCON 220 to be displayed on the LCD panel 216.

In one embodiment, the scaling unit 230 is also configured to selectively disable temporal dithering based on the scaled image data. The GPU 250 may be configured to transmit image data to the display 210 with values encoded in the video signal at the full bit depth as stored in the frame buffer. In other words, the image data received by the scaling unit may include values having a bit depth that is greater than the bit depth capable of being presented by the display 210. The scaling unit 230, when transmitting scaled image data to the TCON 220, may be configured to adjust the bit depth of each value to match a bit depth corresponding to the LCD panel 216.

In one embodiment, the scaling unit 230 may be configured to implement temporal dithering in a similar manner to the technique discussed above in connection with FIG. 3 as implemented by the GPU 250. In other words, the scaling unit 230 receives the current frame of image data via the interface 240, determines the dynamic refresh rate associated with the current frame of image data, and then scales the current frame of image data to match a native resolution of the display 210, selectively applying the dither pattern to the scaled image data based on the dynamic refresh rate. In one embodiment, the scaling unit 230 determines the dynamic refresh rate by calculating a delay between frames of image data received by the scaling unit 230 via the interface 240, utilizing, e.g., a system clock included in the display 210 and timestamps associated with the frames of image data stored in the memory 420. In another embodiment, the GPU 250 transmits metadata associated with each frame that includes the delay time for the current frame in the video signals transmitted via the interface 240 such that the scaling unit 230 reads the delay time from the video signal and determines the dynamic refresh rate based on the delay time. Once the scaling unit 230 has determined the dynamic refresh rate for the current frame, the scaling unit 230 selectively disables temporal dithering based on the dynamic refresh rate.

More specifically, the scaling unit 230 may decode the values for the current frame of image data from the video signal and store the current frame of image data in the memory 420. The scaling unit 230 may also store a plurality of dither patterns in the memory 420 or in registers of the scaling unit 230 and implement a counter that represents a relative position of the current frame of image data in the video stream. The counter may be incremented each time a new frame of image data is received in the video signal via the interface 240. When the dynamic refresh rate, as calculated by the scaling unit 230, is less than a first threshold value such that temporal dithering is disabled, then the scaling unit 230 may simply truncate the values in the frame of image data such that the bit depth of the values transmitted to the TCON 220 match a bit depth of the LCD panel 216. Conversely, when the dynamic refresh rate is greater than or equal to a second threshold value such that temporal dithering is enabled, then the scaling unit 230 may apply a dither pattern to the values based on the counter and the truncated bits, similar to the manner implemented by the GPU 250 described above.

In this embodiment, the logic for selectively disabling temporal dithering has been moved from the GPU 250 to the display 210 and more specifically to a scaling unit 230 within the display 210. The GPU 250 simply encodes the frames of image data in the video signals at the same bit depth with which the values were rendered, and the display 210 manages the selective disabling of temporal dithering based on the dynamic refresh rate associated with each frame of image data. However, in yet another embodiment, the selective disabling of temporal dithering may be managed by the TCON 220 instead of the scaling unit 230 within the display 210.

In one embodiment, the display 210 may not include a scaling unit 230. For example, in some laptops, the GPU 250 may drive the LCD panel 216 directly, via a TCON 220. In other words, the GPU 250 is configured to generate a video signal at the same resolution as the LCD panel 216 and the video signal is transmitted directly to the TCON 220 via an interface 240. In another example, some monitors may comprise so-called direct drive monitors that do not include a scaler. In direct drive monitors, the GPU 250 is again configured to generate a video signal at the same resolution as the LCD panel 216 and the video signal is transmitted directly to the TCON 220 via an interface 240. In such embodiments, the GPU 250 typically manages the selective disabling of the temporal dithering, as described above.

Figure 5:
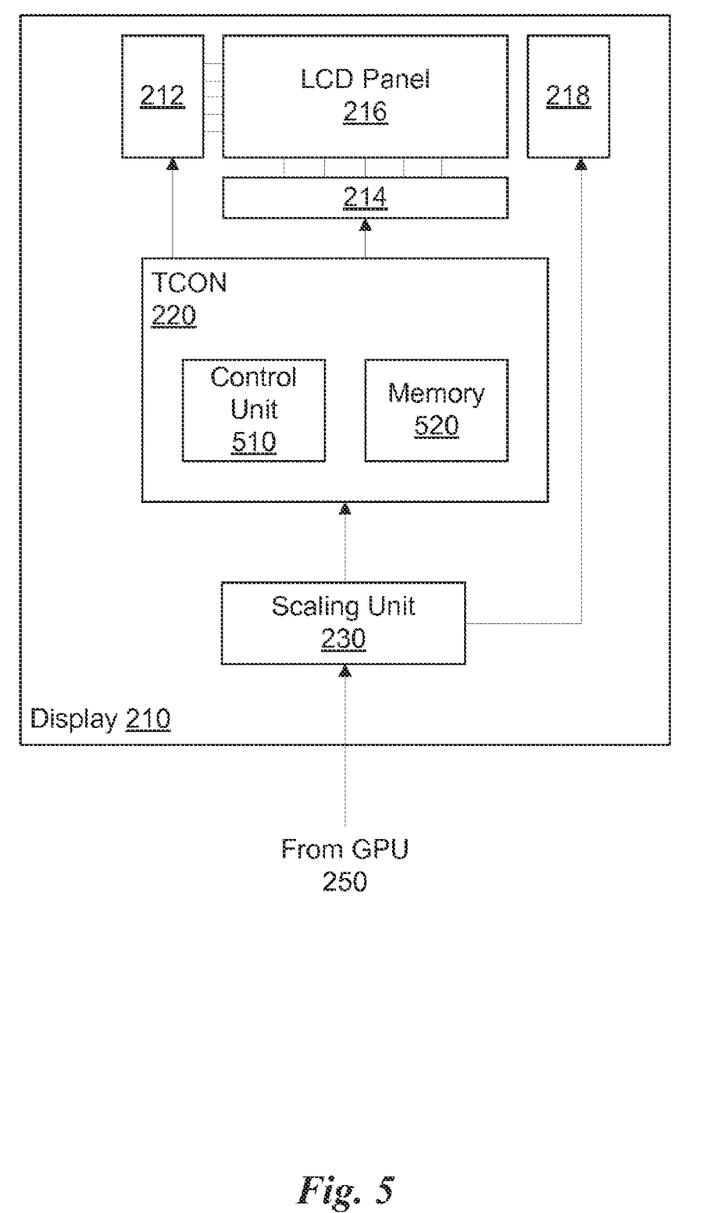
FIG. 5 illustrates the operation of the TCON of FIG. 2, in accordance with another embodiment.

FIG. 5 illustrates the operation of the TCON 220 of FIG. 2, in accordance with another embodiment. The TCON 220 includes a control unit 510 and memory 520. The memory 520 may include SRAM and/or registers. In this embodiment, the TCON 220 is configured to selectively disable temporal dithering based on the dynamic refresh rate. The TCON 220 may be a fixed function hardware unit embodied on an ASIC (application specific integrated circuit) included in the display 210. In another embodiment, the TCON 220 may be included on a larger ASIC that includes the scaling unit 230.

The control unit 510 is configured to transmit signals to the row drivers 212 and column drivers 214 based on the scaled image data received from the scaling unit 230. The TCON 220 receives a frame of scaled image data from the scaling unit 230, where the frame of scaled image data is received in, e.g., row major order one component value at a time. In this embodiment, the scaling unit 230 may transmit the frame of scaled image data to the TCON 220 at a bit depth that includes a first portion of bits that match a bit depth of the LCD panel 216 along with one or more truncated bits utilized for temporal dithering. For example, the scaling unit 230 may receive image data from the GPU 250 at a bit depth of ten bits per component. However, the LCD panel 216 may be associated with a bit depth of six bits, and the TCON 220 may be capable of implementing temporal dithering using two additional bits of bit depth. Thus, the scaling unit 230 may scale the frame of image data and truncate the ten-bit values to the most significant eight bits, where the six most significant bits represent the base value and the two least significant bits of the most significant eight bits represent the truncated bits used to select a dither pattern to be applied to the base value. Alternately, the scaling unit 230 may transmit each value to the TCON 220 at the full bit depth (e.g., all ten bits).

The TCON 220 may selectively disable temporal dithering based on the dynamic refresh rate of the scaled image data received from the scaling unit 230. For example, the TCON 220 may store timestamps related to one or more frames of scaled image data as each frame of image data is received. The TCON 220 may store the timestamps in a circular buffer implemented in the memory 520. The circular buffer may be implemented in a dedicated SRAM along with registers that store a head and/or tail pointer for the circular buffer. The TCON 220 may have access to a system clock that can be read and a value of the system clock may be stored in the circular buffer each time a new frame is received. By subtracting two values in the circular buffer, the TCON 220 may determine a delay time associated with a frame of scaled image data and a dynamic refresh rate associated with the current frame of scaled image data. In another embodiment, the scaling unit 230 calculates the delay time based on the received video signal and transmits the delay time to the TCON 220 to calculate the dynamic refresh rate.

When the dynamic refresh rate associated with the frame of scaled image data is less than a first threshold value, the TCON 220 may disable temporal dithering and may control the row drivers 212 and column drivers 214 to display the image data according to the base values, discarding the truncated bits of each value. However, when the dynamic refresh rate associated with the frame of scaled image data is greater than or equal to a second threshold value, the TCON 220 may enable temporal dithering and may control the row drivers 212 and column drivers 214 to display either the base value or the incremental value associated with each value in the frame of scaled image data.

In one embodiment, the TCON 220 may store a plurality of dither patterns in the memory 520, such as in a plurality of specially allocated registers, each register storing one of the dither patterns. As the TCON 220 receives a value, the TCON 220 may select one of the dither patterns to be applied to the value, generating a modified value that either matches the base value or an incremental value that is one greater than the base value at the bit depth of the LCD panel 216. The modified value may be based on a particular dither pattern selected based on the truncated bits of the value and a value of a counter, maintained by the TCON 220, that represents the relative position of the frame of scaled image data in the video stream. For example, a particular bit of the selected dither pattern as specified by some number of least significant bits of the counter is read to determine if the modified value should be equal to the base value or the incremental value. Then the TCON 220 may control the row drivers 212 and column drivers 214 to display the image data according to the modified values.

Figure 6:
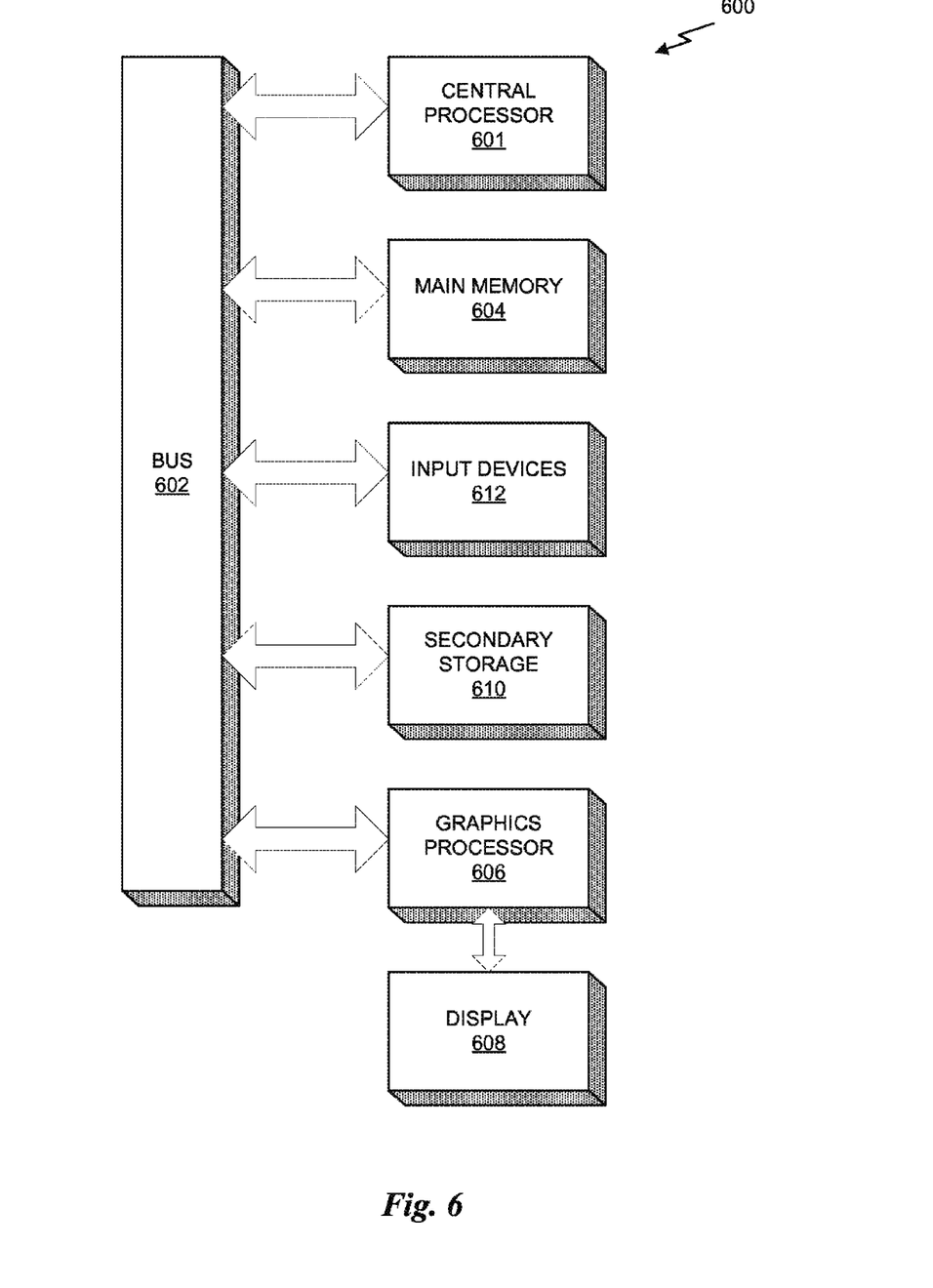
FIG. 6 illustrates an exemplary system in which the various architecture and/or functionality of the various previous embodiments may be implemented.

It will be appreciated that, as described above, selectively disabling temporal dithering may be implemented by any one of the GPU 250, the scaling unit 230 of the display 210, or the TCON 220 of the display 210. Furthermore, the various embodiments described above may be implemented in the graphics processor 606 and display 608 of system 600, described below.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    configuring a display device utilizing a dynamic refresh rate, the display device configured to operate synchronously with a processing unit configured to generate image data for presentation on the display device; and
    selectively disabling temporal dithering based on the dynamic refresh rate,
    wherein each frame of image data includes a plurality of pixels, each pixel encoding a color value having a plurality of components, and
    wherein truncated bits for each component of the color values encoded by the plurality of pixels are discarded when temporal dithering is disabled.

2. The method of claim 1, wherein the display device is one of a liquid crystal display (LCD), a light emitting diode (LED) display, an organic light emitting diode (OLED) display, and an active-matrix OLED (AMOLED) display.

3. The method of claim 2, wherein the display device refreshes a plurality of pixel elements in the display device in response to receiving a frame of image data via a video interface.

4. The method of claim 1, wherein selectively disabling temporal dithering based on the dynamic refresh rate comprises:

determining the dynamic refresh rate associated with a current frame of image data; and disabling temporal dithering for the current frame of image data when the dynamic refresh rate is less than a first threshold value, or enabling temporal dithering for the current frame of image data when the dynamic refresh rate is greater than or equal to a second threshold value.

5. The method of claim 4, wherein the first threshold value is equal to the second threshold value.

6. The method of claim 4, wherein the first threshold value is less than the second threshold value by an offset value to implement a hysteresis in selectively disabling the temporal dithering.

7. The method of claim 6, wherein the first threshold value is approximately 50 Hz, the second threshold value is approximately 60 Hz, and the offset value is 10 Hz.

8. The method of claim 4, wherein the first threshold value and the second threshold value are specified by a user.

9. The method of claim 4, wherein determining the dynamic refresh rate associated with the current frame of image data comprises calculating a delay time by subtracting a time associated with a previous frame of image data from a time associated with the current frame of image data, wherein the current frame of image data is presented on the display device immediately subsequent to the previous frame of image data.

10. The method of claim 4, wherein determining the dynamic refresh rate associated with the current frame of image data comprises calculating an average delay time associated with N frames of image data by dividing a difference between a time associated with an $N^{th}$ frame of image data in the plurality of frames of image data from a time associated with the current frame of image data in the plurality of frames of image data with N, wherein the current frame of image data is presented on the display device N−1 frames after the $N^{th}$ frame of image data.

11. The method of claim 4, wherein the processing unit comprises a graphics processing unit (GPU) configured to:
 determine the dynamic refresh rate associated with the current frame of image data; and
 enable or disable the temporal dithering based on the dynamic refresh rate.

12. The method of claim 4, wherein a scaling unit included in the display device is configured to:
 receive the current frame of image data via a video interface;
 scale the current frame of image data to match a native resolution of the display device;
 determine the dynamic refresh rate associated with the current frame of image data; and
 enable or disable the temporal dithering based on the dynamic refresh rate.

13. The method of claim 4, wherein a timing controller included in the display device is configured to:
 receive the current frame of image data;
 determine the dynamic refresh rate associated with the current frame of image data;
 enable or disable the temporal dithering based on the dynamic refresh rate; and
 control row drivers and column drivers to present the current frame of image data on a screen of the display device.

14. The method of claim 1, wherein truncated bits for each component of the color values encoded by the plurality of pixels are utilized to select a dither pattern to apply to the image data when temporal dithering is enabled.

15. A non-transitory computer-readable storage medium storing instructions that, when executed by a processor, cause the processor to perform steps comprising:
 configuring a display device utilizing a dynamic refresh rate, the display device configured to operate synchronously with a processing unit configured to generate image data for presentation on the display device; and
 selectively disabling temporal dithering of the images based on the dynamic refresh rate,
 wherein each frame of image data includes a plurality of pixels, each pixel encoding a color value having a plurality of components, and
 wherein truncated bits for each component of the color values encoded by the plurality of pixels are discarded when temporal dithering is disabled.

16. The non-transitory computer-readable storage medium of claim 15, wherein selectively disabling temporal dithering based on the dynamic refresh rate comprises:
 determining the dynamic refresh rate associated with a current frame of image data; and
 disabling temporal dithering for the current frame of image data when the dynamic refresh rate is less than a first threshold value, or
 enabling temporal dithering for the current frame of image data when the dynamic refresh rate is greater than or equal to a second threshold value.

17. The non-transitory computer-readable storage medium of claim 16, wherein determining the dynamic refresh rate associated with the current frame of image data comprises calculating a delay time by subtracting a time associated with a previous frame of image data from a time associated with the current frame of image data, wherein the current frame of image data is presented on the display device immediately subsequent to the previous frame of image data.

18. The non-transitory computer-readable storage medium of claim 15, wherein truncated bits for each component of the color values encoded by the plurality of pixels are utilized to select a dither pattern to apply to the image data when temporal dithering is enabled.

19. A system, comprising:
 a display device that utilizes a dynamic refresh rate; and
 a processing unit configured to generate image data for presentation on the display device, wherein the display device is configured to operate synchronously with the processing unit,
 wherein temporal dithering of the images is selectively disabled based on the dynamic refresh rate,
 wherein each frame of image data includes a plurality of pixels, each pixel encoding a color value having a plurality of components,
 wherein truncated bits for each component of the color values encoded by the plurality of pixels are discarded when temporal dithering is disabled.

20. The system of claim 19, wherein selectively disabling temporal dithering based on the dynamic refresh rate comprises:
 determining the dynamic refresh rate associated with a current frame of image data; and
 disabling temporal dithering for the current frame of image data when the dynamic refresh rate is less than a first threshold value, or
 enabling temporal dithering for the current frame of image data when the dynamic refresh rate is greater than or equal to a second threshold value.

21. The system of claim 20, wherein the display device includes a scaling unit that is configured to:

receive the current frame of image data via a video interface;

scale the current frame of image data to match a native resolution of the display device;

determine the dynamic refresh rate associated with the current frame of image data; and enable or disable the temporal dithering based on the dynamic refresh rate.

22. The system of claim 20, wherein the processing unit comprises a graphics processing unit configured to:

determine the dynamic refresh rate associated with the current frame of image data; and enable or disable the temporal dithering based on the dynamic refresh rate.

23. The system of claim 19, wherein truncated bits for each component of the color values encoded by the plurality of pixels are utilized to select a dither pattern to apply to the image data when temporal dithering is enabled.

* * * * *

UNITED STATES PATENT AND TRADEMARK OFFICE
CERTIFICATE OF CORRECTION

PATENT NO. : 9,837,030 B2
APPLICATION NO. : 14/712821
DATED : December 5, 2017
INVENTOR(S) : Tom Verbeure It is certified that error appears in the above-identified patent and that said Letters Patent is hereby corrected as shown below:

In the Claims

At Column 16, Claim number 15, Line number 8, delete "of the images".

Signed and Sealed this
Ninth Day of October, 2018

Andrei Iancu
*Director of the United States Patent and Trademark Office*